United States Patent [19]

Williams et al.

[11] Patent Number: 5,761,272

[45] Date of Patent: Jun. 2, 1998

[54] METHOD OF AND SYSTEM FOR PERFORMING TELECOMMUNICATIONS STRESS TESTING

[75] Inventors: Eugene E. Williams; Brian S. Badger, both of Dallas; Craig E. Newman, Wylie, all of Tex.

[73] Assignee: MCI Communications Corporation, Washington, D.C.

[21] Appl. No.: 753,550

[22] Filed: Nov. 26, 1996

[51] Int. Cl.⁶ .................. H04M 1/00; H04M 3/08
[52] U.S. Cl. .................. 379/10; 379/15; 379/12
[58] Field of Search .................. 379/9–18, 1; 371/23, 371/20.1; 355/500; 370/241, 242, 250, 251, 252

[56] References Cited

U.S. PATENT DOCUMENTS

| | | | |
|---|---|---|---|
| 4,238,649 | 12/1980 | Kemler | 379/10 |
| 5,369,680 | 11/1994 | Borbas et al. | 379/13 |
| 5,479,473 | 12/1995 | Zey | 379/15 |
| 5,539,802 | 7/1996 | De Caluwe et al. | 379/15 |
| 5,621,670 | 4/1997 | Maeda et al. | 379/11 |

Primary Examiner—Curtis Kuntz
Assistant Examiner—Paul Loomis

[57] ABSTRACT

A method of and system for managing telecommunications system testing. The system displays a list of available originating and terminating bulk call generators. The user can graphically select the bulk call generators to be used in the test and can communicate with selected bulk call generators through the interface. The system also displays a list of available test case scripts. The system enables the user to formulate a mix of scripts to be executed by displaying a control for each selected test case script. The system further enables a user to designate different mixes of scripts for selected time periods over a test run. The system then assigns each script to a call program and a group of call programs to a set. The system then starts the set at the user predefined time. The system the stops the set and resets each call program and set based on the previously chosen call mixes.

24 Claims, 10 Drawing Sheets

METHOD OF AND SYSTEM FOR PERFORMING TELECOMMUNICATIONS STRESS TESTING

FIELD OF THE INVENTION

The present invention relates generally to telecommunications testing systems and methods, and more particularly to a method of and system for stress testing telecommunications system that includes a graphical system for managing test cases.

BACKGROUND OF THE INVENTION

An important phase of the development of new telecommunications services and facilities is testing. Whenever new equipment is added to a network or a new service feature is implemented in a network, the telecommunication service provider must run tests on the network to see how the new equipment or feature operates in the network and how the new equipment or feature works with other equipment and features to affect the performance of the network as whole.

One form of telecommunications system testing is stress testing. Stress testing involves running a high volume of calls on the system being tested. A new feature or device may not affect network performance at low call volumes, but as volume increases, calls may compete for network resources in ways that were not anticipated and thereby reduce system performance.

A key piece of telecommunications system testing equipment is the bulk call generator, such as those available from Ameritec. Bulk call generators are computer controlled devices that are capable of automatically placing and receiving telephone calls. A bulk call generator has a plurality of ports, with each port being able make or receive a call, independent of and simultaneous with other ports of the call generator. Bulk call generators are thus able to make large volumes of calls and they are useful in stress testing.

Bulk call generators are programmable to run call programs. A call program is based on a script for a particular type of call. Call programs for a test run are assembled into sets. The call programs of a set are allocated among the ports of the call generator. A test run may involve several bulk call generators. During the test run each port that is used makes calls based on its assigned call program.

Setting up stress runs is currently a difficult and time consuming process. While bulk call generators are programmable, they do not have a remote Gui interface. Setting up mixes of call programs and changing mixes over a stress run requires separately programming each call bulk call generator and allocating the call programs to the required ports manually.

SUMMARY OF THE INVENTION

The present invention provides a method of and system for managing telecommunications system stress testing. The system provides a user friendly graphical user interface by which a user can set up and run sets of call programs on bulk call generators.

The system displays a list of available originating and terminating bulk call generators. The user can graphically select the bulk call generators to be used in the test and can communicate with selected bulk call generators through the interface. The system also displays a list of available test case scripts. The user can graphically select test case scripts to be included in a set of call programs. The system generates call programs in response to user selection of selected test case scripts from the list of available test case scripts.

The system enables the user to formulate a mix of call programs to be executed by displaying a control for each selected test case script of the set. The control is operable by the user to set a percentage of available ports of the selected bulk call generators to be allocated to the call program associated with each selected test case script. The system also displays a composite control that indicates the percentage of available ports allocated to all call programs of the set. The composite control is operable by the user to increase or decrease the percentage of available ports allocated to all the call programs of the set.

The system further enables a user to designate different mixes of call programs of the set for selected time periods over a test run. The system prompts the user to enter a start time and an end time for the test run. Then, based on the start time and end time entered by the user, the system displays a control that permits the user to select particular times between the start time and the end time. In response to user selection of a particular time, the system displays a call mix control that is user operable to control the mix of call programs run at the selected particular time.

DESCRIPTION OF THE PREFERRED EMBODIMENT

Figure 1:
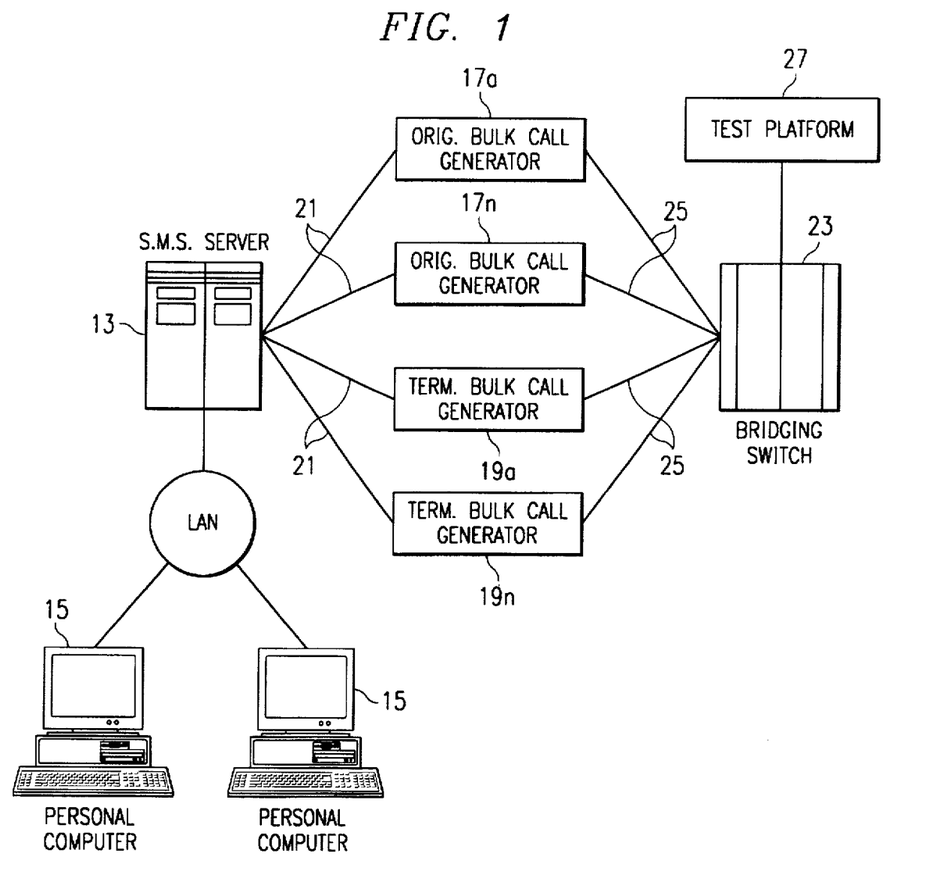
FIG. 1 is a high level block diagram of a system according to the present invention.

Referring now to the drawings, and first to FIG. 1, the system of the present invention is designated generally by the numeral 11. System 11 includes a stress management system server 13 and a network of personal computer workstation clients 15. Personal computer workstation clients 15 provide a graphical user interface by which users can set up and manage stress testing.

Stress management system server 13 communicates with a plurality of originating bulk call generators 17a–17n and a plurality of terminating bulk call generators 19a–19n via TCP/IP connections 21. Each bulk call generator includes a plurality of ports that are connected to a bridging switch 23 by standard T1 telephone lines 25. In the preferred embodiment, each bulk call generator includes 96 ports. Therefore, the system of the present invention is capable of originating 96 times the number of originating bulk call generators a–n simultaneously.

Bridging switch 23 is connected to a test platform designated generally by the numeral 27. Test platform 27 includes the telephone system components to be tested. Test platform 27 may include automatic call distribution components, validation components, operator console components, and other components that are well known to those skilled in the telecommunications art.

Figure 2:
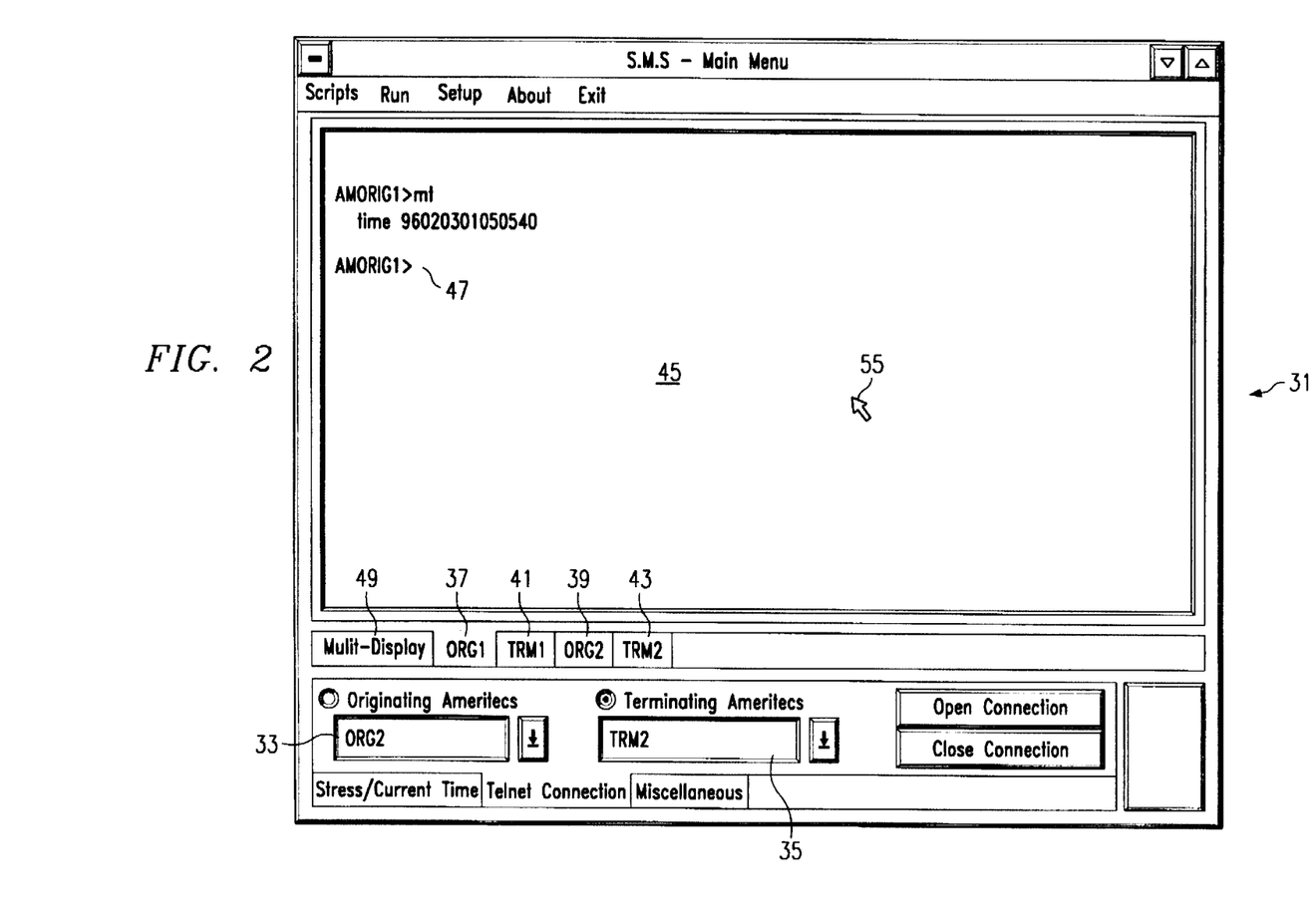
FIG. 2 is a pictorial of a main menu screen of the graphical user interface according to the present invention.

Referring now to FIG. 2, the main window screen of a personal computer workstation client is designated generally by the numeral 31. The personal computer workstation client 31 is preferably implemented in a graphical operating environment, such as the Windows™ environment. Main window 31 includes a dropdown list 33 by which a user may select originating bulk call generators, and a dropdown list 35 by which a user may select terminating bulk call generators. Whenever a user selects an originating or terminating bulk call generator, the system displays a tab in main window 31 that indicates the selection. Thus, in FIG. 2, the user has selected originating bulk call generators ORG1 and ORG2, as indicated by tabs 37 and 39, respectively, and terminating bulk call generators TRM1 and TRM2, as indicated by tabs 41 and 43, respectively.

In FIG. 2, tab 37 is shown selected so as to provide an interface to originating bulk call generator ORG1 in main client area 45 of main window 31. As shown in FIG. 2, a command prompt 47 is displayed by which a user can issue commands to originating bulk call generator ORG1.

Figure 3:
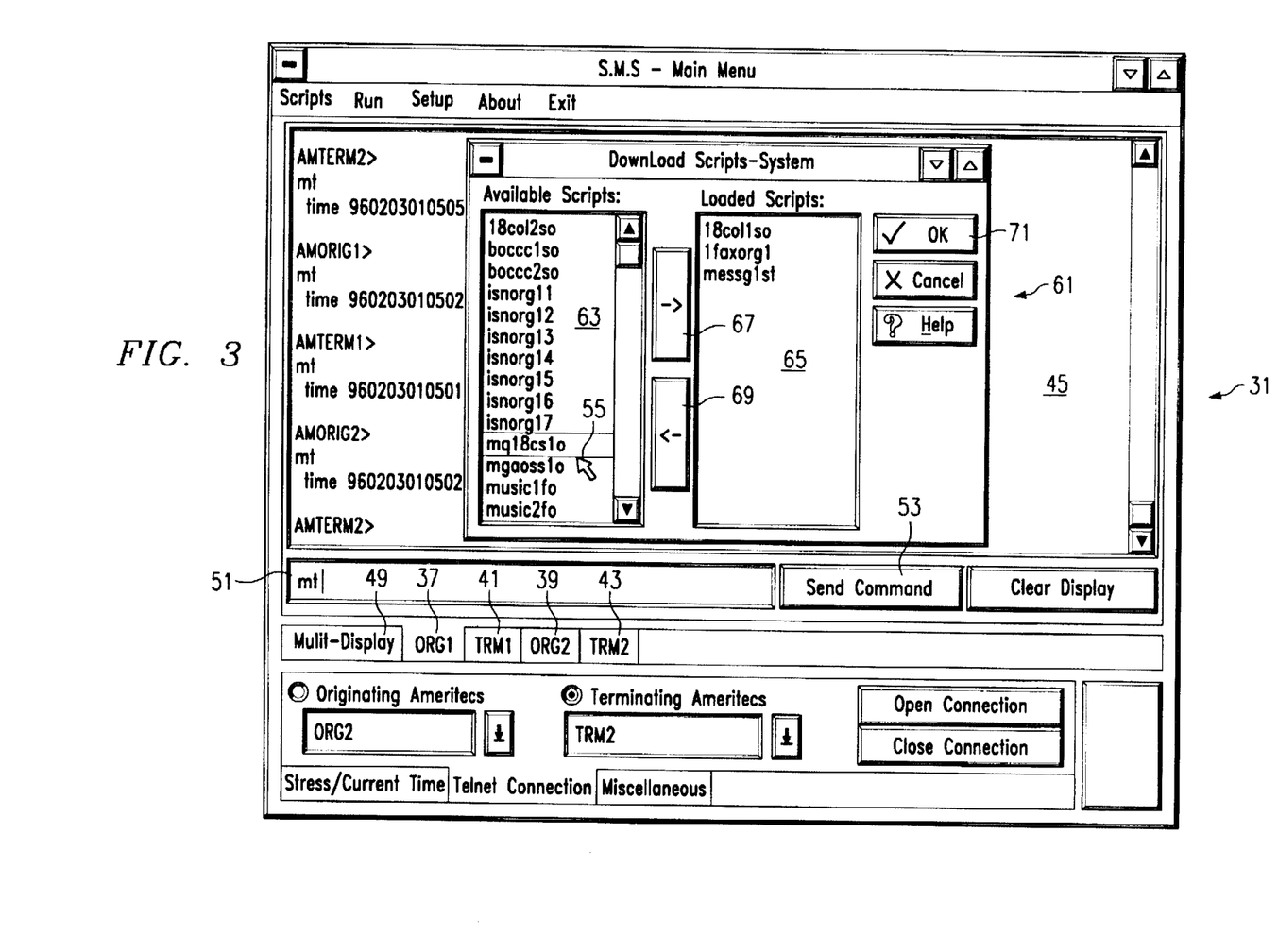
FIG. 3 is a pictorial view of a script selection dialogue of the graphical user interface according to the present invention.

Referring now to FIG. 3, main window 31 also includes a multiple display tab 49. Selection of multiple display tab 49 surfaces a composite display of all selected originating and terminating bulk call generators. The multiple display includes a command line interface 51 by which a user can issue commands simultaneously to all selected bulk call generators by typing the command in command line interface 51 and clicking on a Send Command push button 53 with mouse pointer 55. In the preferred embodiment, tabs 37-43 are color coded to correspond to the character display in main client area 45 of main window 31 so as to make recognition of the character displays for the various bulk call generators easier.

In FIG. 3, a script selection dialog is designated generally by the numeral 61. Script selection dialog includes a scrollable list 63 of available scripts and a list 65 of scripts to be loaded. A user can graphically select available scripts listed in list 63 with mouse pointer 55 and move the selected script to list 65 by clicking on transfer button 67. The user can deselect scripts by selecting the script to be deselected in list 65 and clicking on transfer button 69.

Figure 4:
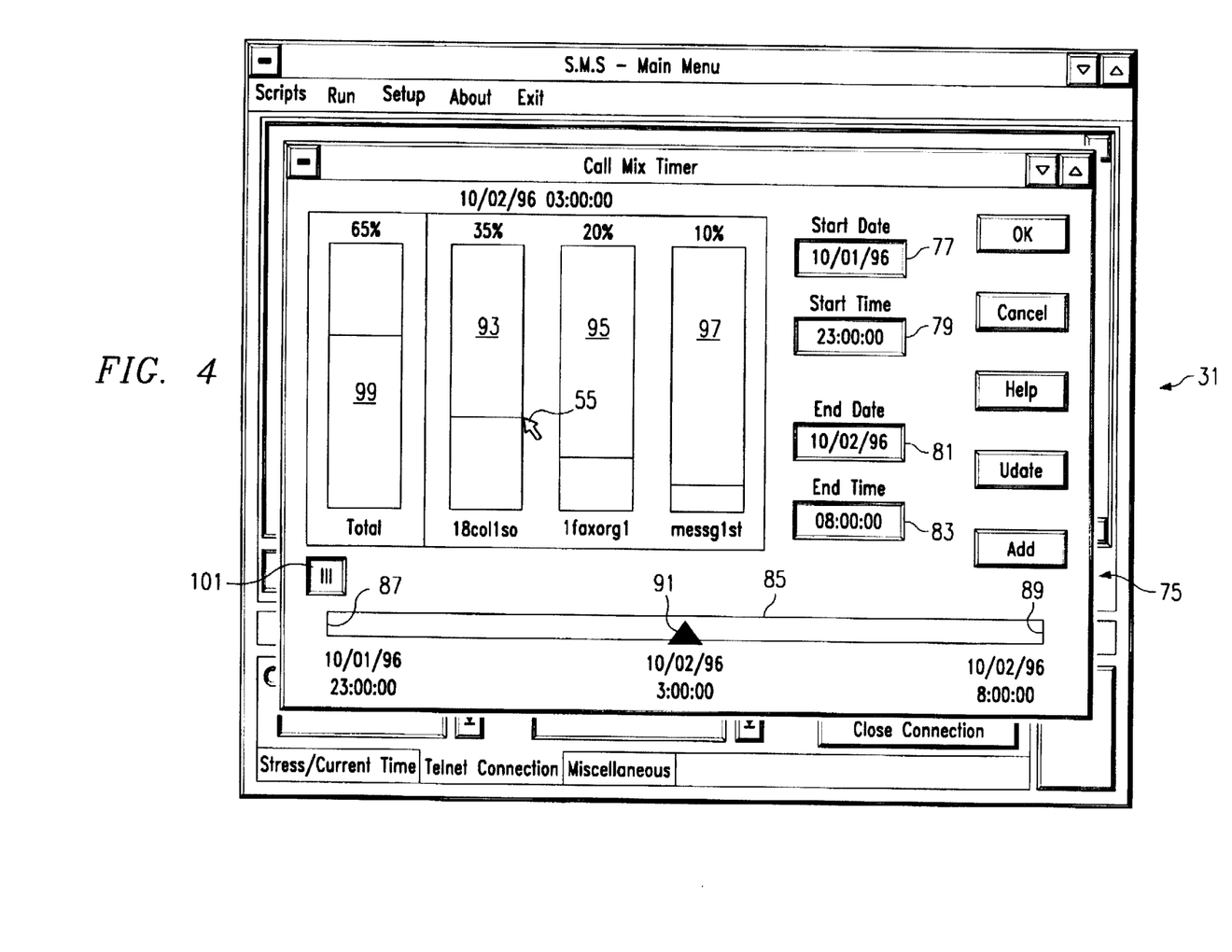
FIG. 4 is a pictorial view of a call mix timer dialogue of the graphical user interface according to the present invention.

Referring now to FIG. 4, a call mix timer dialog is designated generally by the numeral 75. Call mix timer dialog 75 allows a user to specify a mix of call programs to be run over the course of the stress test. Call mix timer dialog 75 includes entry fields through which a user may enter a start date 77, a start time 79, an end date 81, and an end time 83. Thus in FIG. 4, a stress run is set to begin at 11:00 p.m. Oct. 1, 1996, and end at 8:00 a.m. Oct. 2, 1996.

Call mix timer dialog 75 also includes a graphical time line control 85. Whenever the user completes the start and end entry fields, the system sets time line control 85 to start at the start time 87 and end at the end time 89. Time line control 85 includes a graphical slider 91 with which a user may select any time intermediate the start and end times using mouse pointer 55. In FIG. 4, slider 91 is positioned at a point corresponding to 3:00 a.m., Oct. 2, 1996.

Call mix timer dialog 75 also includes a call mix control 93-97 for each selected script and a composite call mix control 99. Each call mix control is a graphical bar control that indicates the percentage of ports of the selected bulk call generators that are allocated to each selected script. Thus, in FIG. 4, 35% of the available ports are allocated to script 18col1so, as indicated by call mix indicator 93. Similarly, 20% of the available ports are allocated to script 1faxorg1 and 10% of the available ports are allocated to script messg1st, as indicated by indicators 95 and 97, respectively. Total or composite bar indicator 99 indicates that 65% of the available ports are allocated.

A user can vary the call mix by manipulating the indicators with mouse pointer 55. Thus, in FIG. 4, the user can raise or lower the percentage of ports allocated to script 18col1so by moving indicator 93 up or down. As will be explained in detail, whenever the user changes any of call mix indicators 93-97, total call mix indicator 99 moves to reflect the total of the individual call mixes. Whenever the user changes the total by manipulating indicator 99, the values indicated in each of the individual indicators 93-97 are adjusted proportional to the change in the value of the total.

Whenever the user sets a call mix for a particular time during the stress run, the system places a marker icon 101 along time line control 85. Thus, an initial call mix was set at start time 87. When the user finishes setting a call mix at 3:00 a.m., the system will place a marker icon 101 above slider 91. The user can select as many call mixes for times over the stress run as he or she desires.

Figure 5:
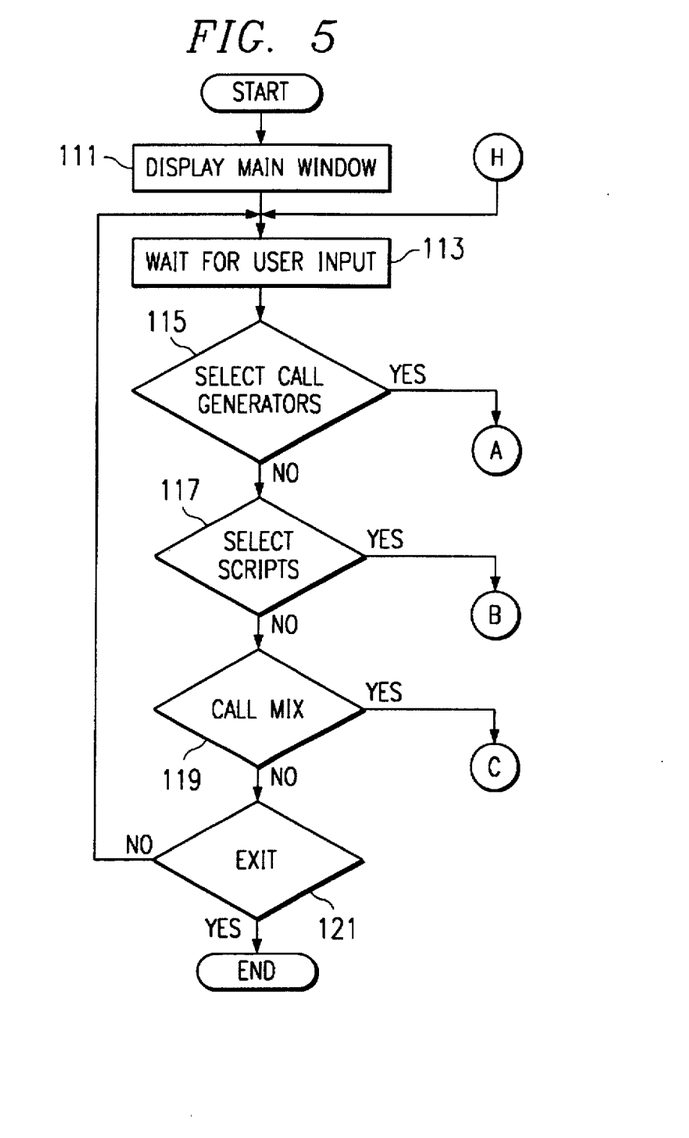
FIG. 5 is a high level flowchart showing the overall logic of a software implementation of the present invention.

Referring now to FIG. 5, there is shown a high level flow chart of the overall logic of a preferred software implementation of the present invention. The system displays the main window at block 111 and waits for user input at block 113. In the flow chart of FIG. 5, the user may select call generators at decision block 115, select scripts at decision block 117, select a call mix at decision 119, or exit at decision 121. If the user selects call generators at decision block 115, the system branches to FIG. 6.

Figure 6:
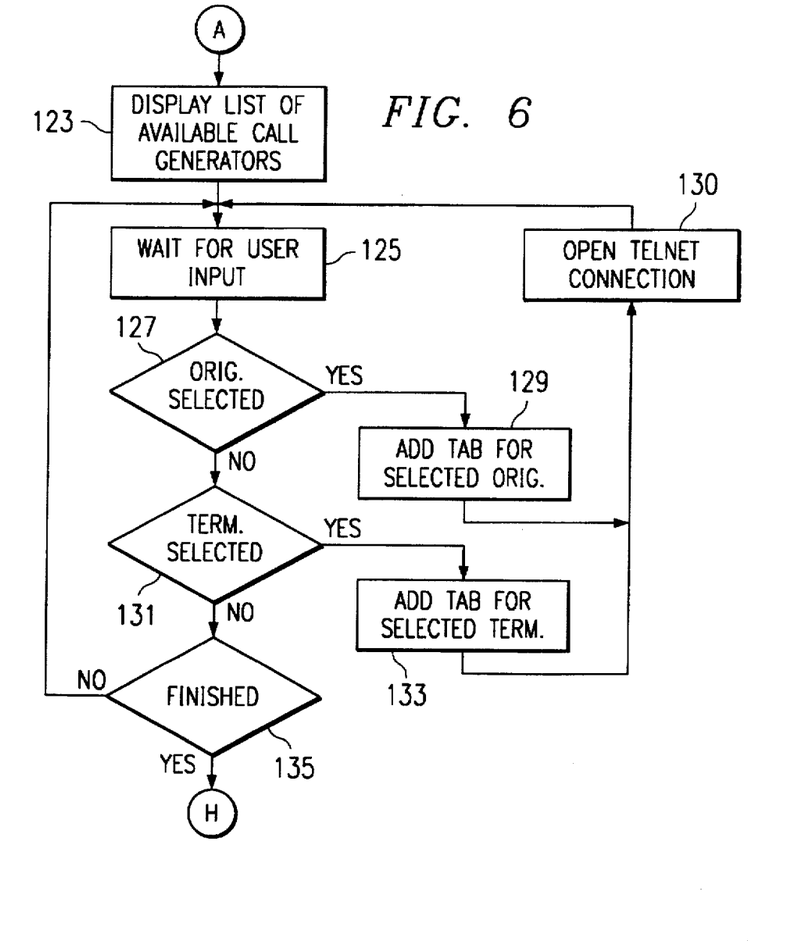
FIG. 6 is a high level flowchart showing the logic of the select call generators routine of FIG. 5.

Referring now to FIG. 6, the system displays a list of available call generators at block 123 and waits for user input at block 125. If, at decision block 127, the user selects an originating bulk call generator, the system adds a tab, as shown in FIG. 2, for the selected originating call generator at block 129, opens a telnet connection at block 130, and returns to block 125 to await further user input. If, at decision block 131, the user selects a terminating bulk call generator, the system adds a tab for the selected terminating bulk call generator at block 133, opens a telnet connection at block 130, and returns to block 125 to await further user input. The system continues to add tabs for selected call generators until the user is finished, at decision block 135, at which time the system returns to block 113 of FIG. 5 to await further user input.

Figure 7:
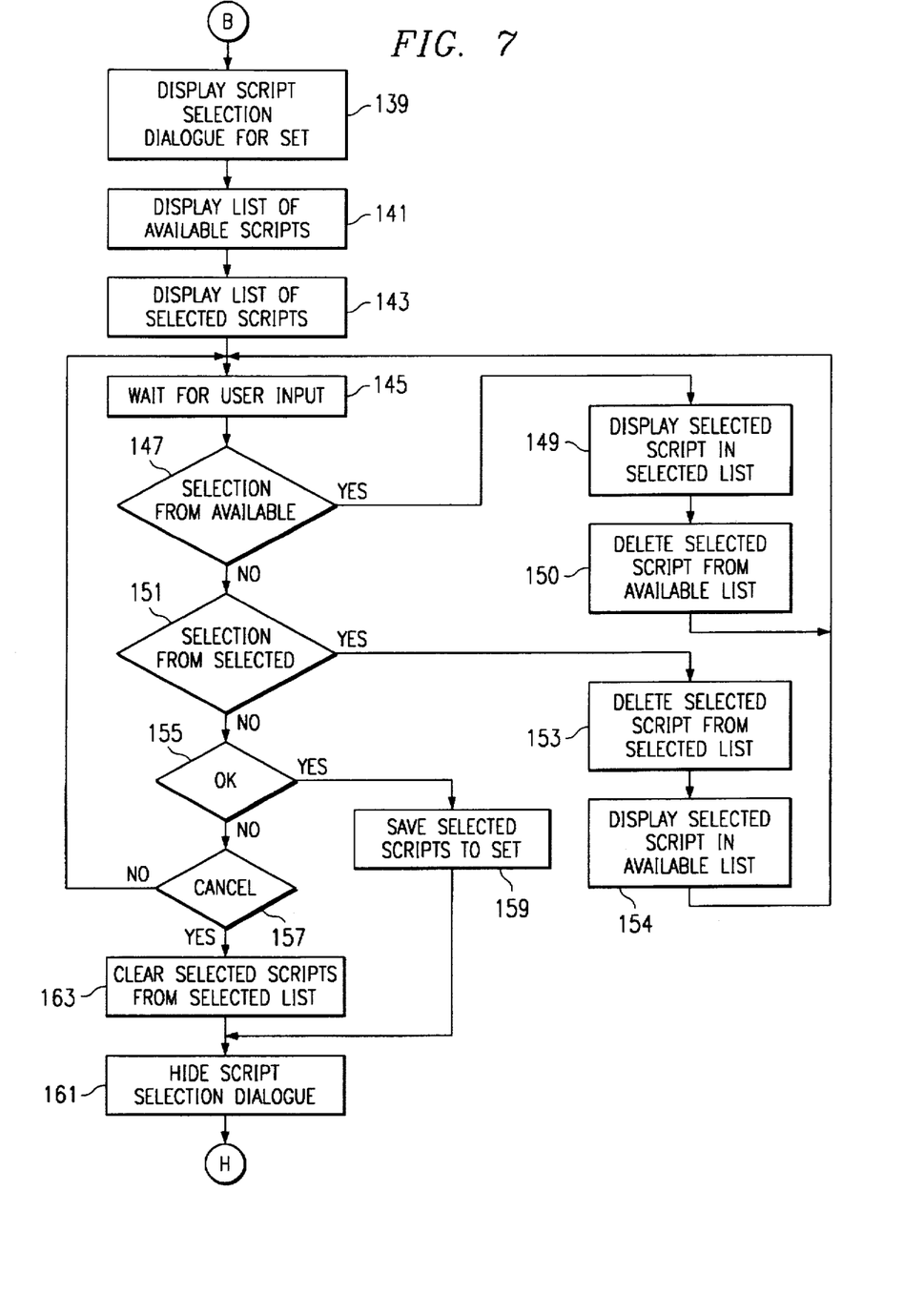
FIG. 7 is a high level flowchart showing the logic of the select scripts routine of FIG. 5.

If, at decision 117 of FIG. 5, the user input is select scripts, the system branches to the flow chart of FIG. 7. Referring to FIG. 7, the system displays the script selection dialog for a set at block 139. The system then displays within the script selection dialog a list of available scripts at block 141 and a list of selected scripts in the set at block 143. Then, the system waits for user input at block 145. If, at decision block 147, the user makes a selection from the list of available scripts, the system displays the selected scripts in the list of selected scripts at block 149, deletes the selected script from the list of available scripts at block 150, and returns to block 145 to await further user input. If, at decision block 151, the user makes a selection from the selected list, the system deletes the selected script from the list of selected scripts at block 153, displays the selected script in the list of available scripts at block 154, and returns to block 145 to await further user input.

The system continues to add and delete scripts until the user selects the OK push button at decision block 155 or the cancel push button at decision block 157. If the user selects the OK push button, at decision block 155, the system saves the selected scripts to the set, at block 159, hides the scripts selection dialog at block 161, and returns to block 113 of FIG. 5 to await further user input. If the user selects the cancel push button at decision block 157, the system clears the selected scripts from the list of selected scripts at block 163, hides the script selection dialog at block 161, and returns.

Figure 8:
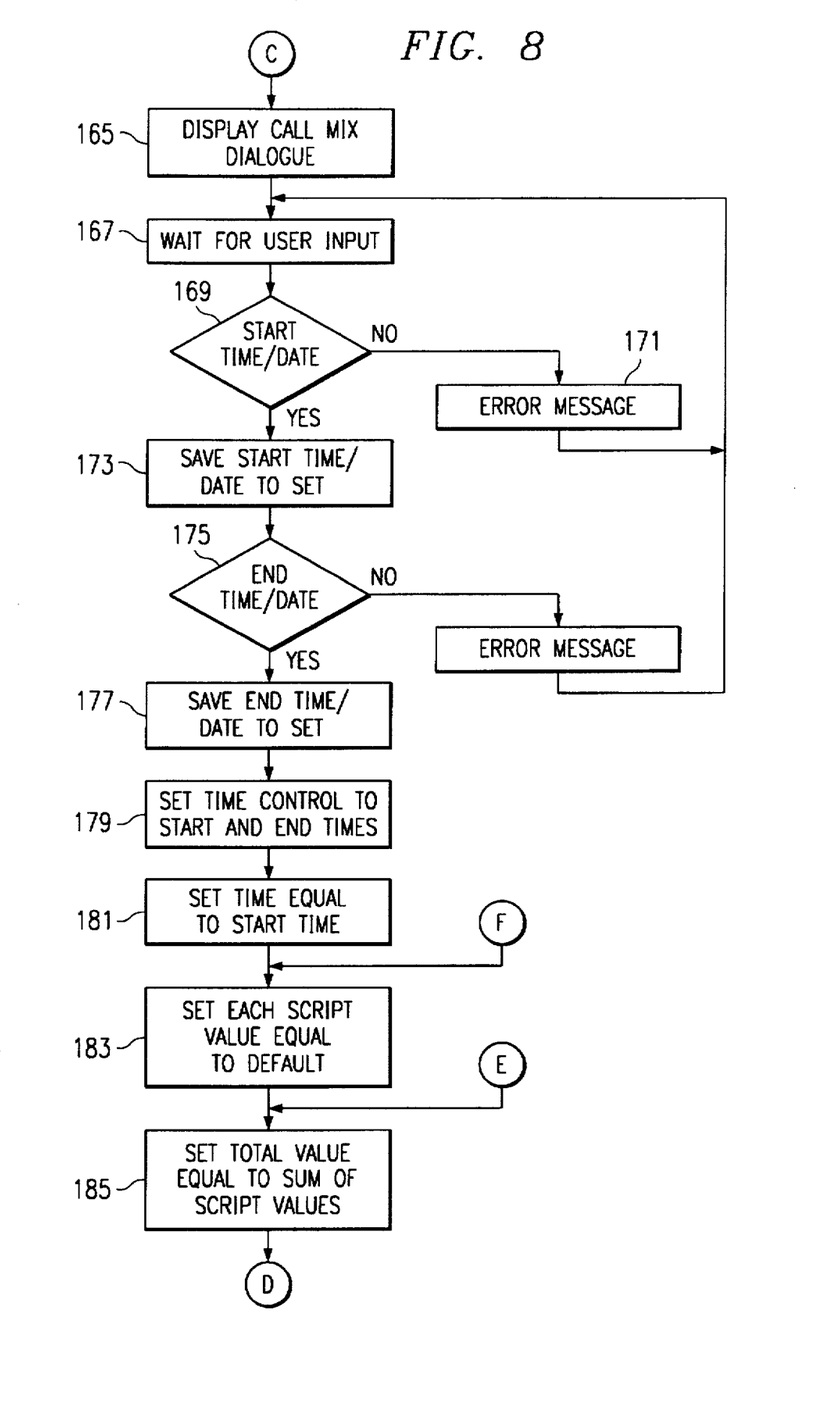
FIG. 8 is a portion of a high level flowchart showing the logic of the call mix routine of FIG. 5.

If at decision block 119 of FIG. 5, the user selects call mix, the system branches to the flow chart of FIG. 8. Referring to FIG. 8, the system displays the call mix dialog, as shown in FIG. 4, at decision block 165 and waits for user input at block 167. The system forces the user to enter a start time and date by the test of decision block 169 and issues an error message at block 171. After the user has entered a start time, the system saves the start time to the set at block 173. Then, the system forces the user to enter an end time and date at decision block 175. After the user has entered an end time, the system saves the end time to the set at block 177.

The system then initializes the call mix timer dialog by setting the time control to the start and end times at block 179, setting the time for the initial call mix at the start time at block 181, and setting each script value equal to a default value of, for example, 10% at block 183. The system then sets the total value equal to the sum of the script values at block 185.

Figure 9:
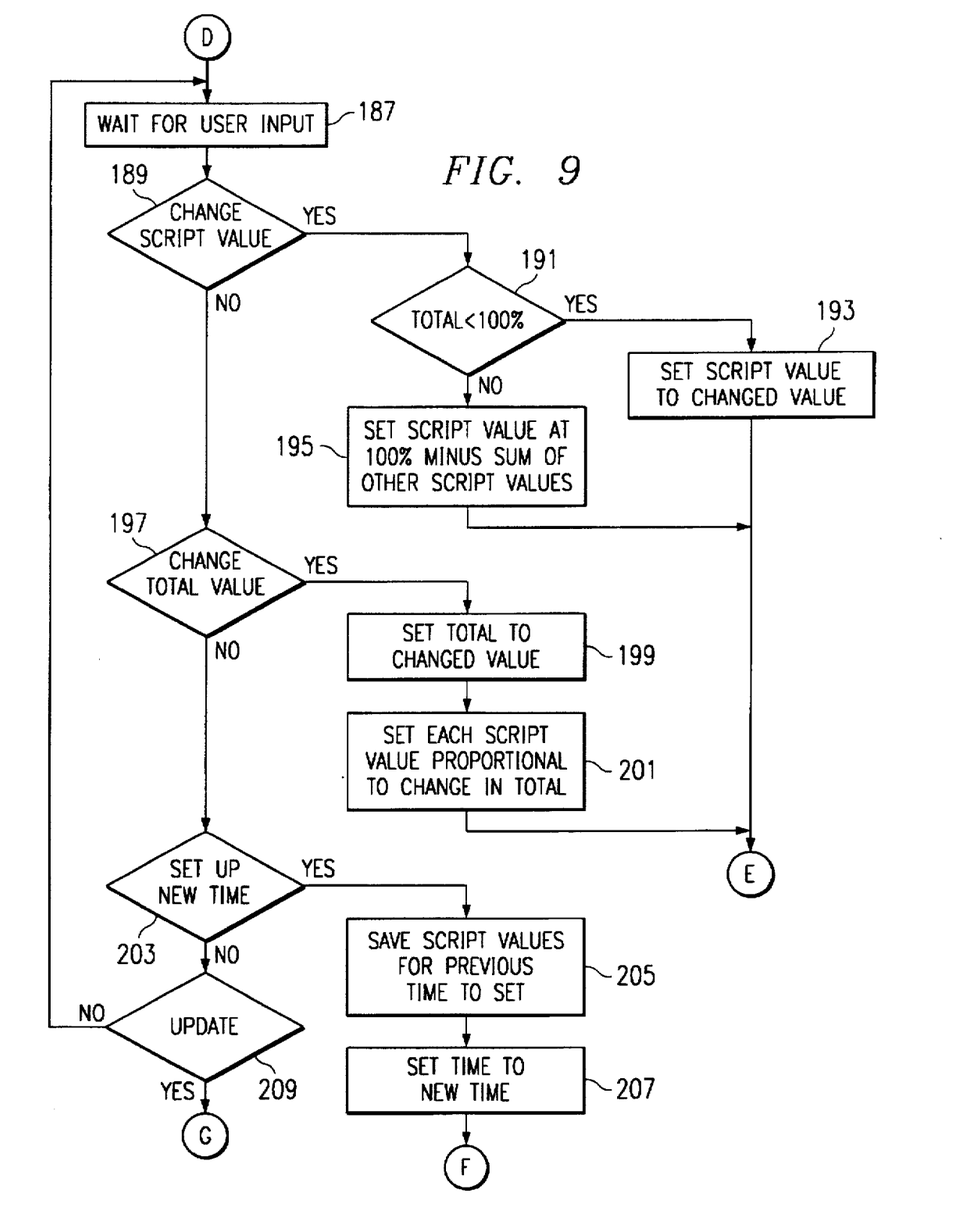
FIG. 9 is an additional portion of a high level flowchart showing the logic of the call mix routine of FIG. 5.

Referring now to FIG. 9, the system waits for user input at block 187. If, at decision block 189, the user changes a script value, the system tests at decision block 191 whether the total of the script values is less than 100%. If the total is less than 100%, the system sets the script value to the changed value, at block 193, and returns to block 185 of FIG. 8 to set the total value equal to the sum of the script values. If, at decision block 191, the total is not less than 100%, the system sets the script value at 100% minus the sum of the other script values, at block 195, and again returns to block 185 of FIG. 8.

Referring still to FIG. 9, if, at decision block 197, the user changes the value of the total, the system sets the total to the changed value, at block 199, and sets each script value proportional to the change in the total value at block 201. For example, if the total is changed from 50% to 100%, then each individual value is doubled.

If, at decision block 203, the user changes the time by moving slider 91 along time line 85 of FIG. 4, the system saves the script values for the previous time to the set, at block 205, sets the time to the new time, at block 207, returns to block 183 of FIG. 8, effectively resetting the call mix controls. The system thus continues to save call mixes for selected times over the stress run until the user selects the update push button at decision block 209.

Figure 10:
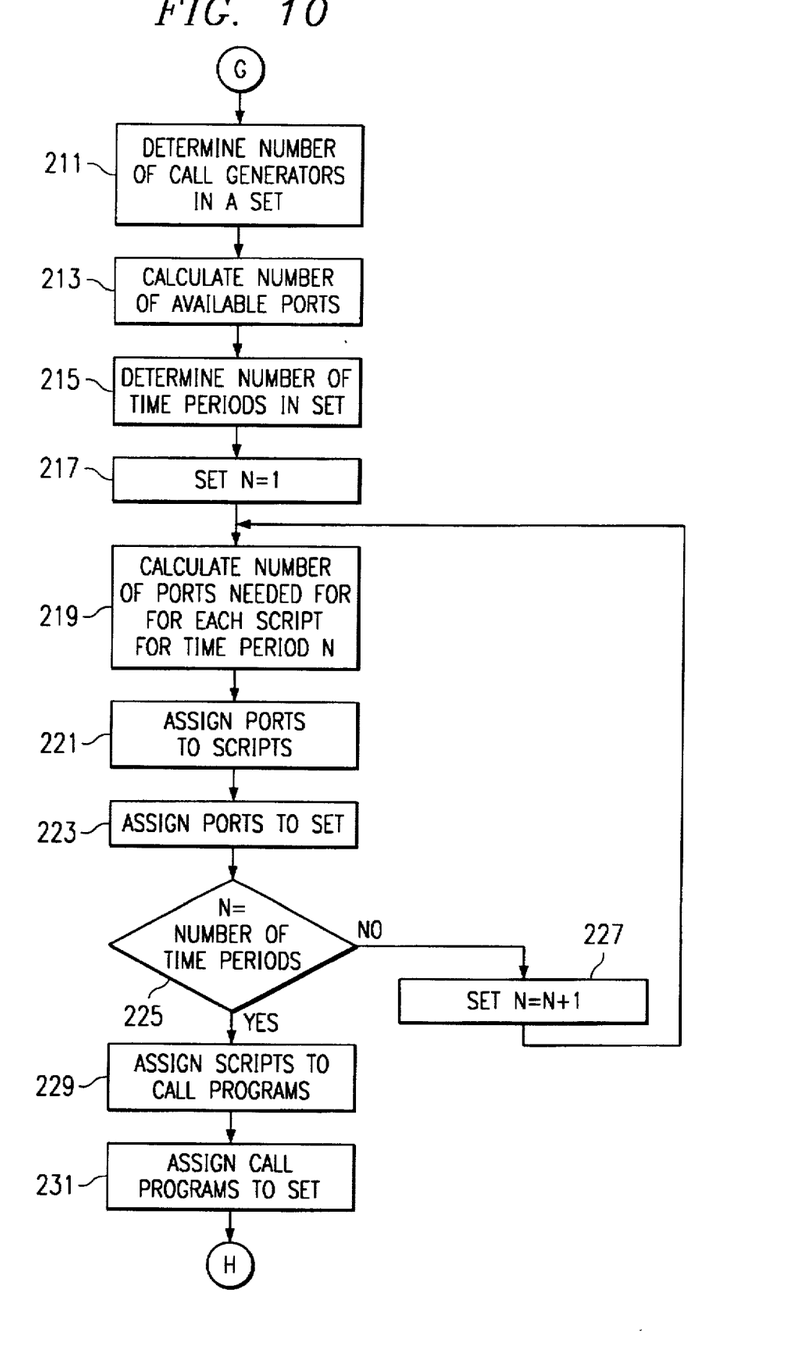
FIG. 10 is an additional portion of a high level flowchart showing the logic of the call mix routine of FIG. 5.

After the user has selected the update push button, at decision block 201, the system branches to the routine of FIG. 10 to perform back work processing in preparation for a stress run. Referring to FIG. 10, the system determines the number of call generators in a set at block 211. The system then calculates the number of available ports at block 213. In the preferred embodiment, each bulk call generator has ninety-six ports, so the calculation of block 213 simply amounts to multiplying the number of selected call generators by ninety-six. Then, the system determines the number of time periods in the set at block 215 and sets the value of a counter to one, at block 217. The system then calculates the number of ports needed for each script for the first time period, at block 219. For example, if the user has selected ten bulk call generators, then nine hundred sixty ports are available. If the user has specified a 20% call mix for a particular script, then one hundred ninety-two ports are needed for that script.

After the system has calculated the number of ports needed for each script for the time period, the system assigns the available ports to the scripts based on the calculation, at block 221, and assigns the ports to the set at block 223. The system then tests at decision block 225 whether the value of the counter is equal to the number of time periods. If not, the system adds 1 to the counter, at block 227, and returns to block 219 to calculate the number of ports needed for each script in the next time period. The system continues to loop through the allocation routine until all time periods have been accounted for. Then, the system converts the scripts to call programs at block 229, and saves the call programs to the set at block 231. Then, the system returns to block 113 of FIG. 5 to await user input.

At the user selected start time and date the system downloads the set to the bulk call generators and starts the stress run with the initial call mix. The bulk call generators run the initial call mix until the start time of the next call mix, if any. The system continues to change call mixes until the end time and date are reached, at which time the stress run is complete. The system collects data and generates reports of system performance over the stress run.

From the foregoing, it may be seen that the method and system of the present invention overcome the shortcomings of the prior art. The method and system of the present invention provide a convenient user-friendly graphical user interface by which a user can set up and manage stress testing without having to be able to program the bulk call generators. In actual practice, the invention has reduced the set up time by a factor of about six.

What is claimed is:

1. A method of managing telecommunications testing, which comprises the computer implemented steps of:
    presenting a list of available originating bulk call generators;
    presenting a list of available terminating bulk call generators;
    associating test case scripts with call programs to form a set; and, designating a mix of call programs of said set to be run on selected bulk call generators.

2. The method as claimed in claim 1, wherein said step of associating test case scripts with call programs includes the computer implemented steps of:
    displaying a list of available test case scripts;
    and, in response to user selection of selected test cases from said list of available test case scripts, generating call programs from said selected test case scripts.

3. The method as claimed in claim 2, wherein said step of associating test case scripts with call programs includes the computer implemented steps of:
    displaying a list of test case scripts to be associated with said call programs;
    in response to user selection of selected test cases from said list of available test case scripts, displaying selected test case scripts in said list of test case scripts to be associated; and, in response to user input, generating call programs from the test case scripts displayed in said list of test case scripts to be associated.

4. The method as claimed in claim 1, wherein each of said bulk call generators includes a plurality of ports and said mix of call programs includes a percentage of ports of said bulk call generators allocated to each generated call program.

5. The method as claimed in claim 4, wherein said step of designating a mix of call programs includes the computer implemented steps of:

computing a number of available ports; and, allocating available ports to call programs based on said mix.

6. The method as claimed in claim 5, wherein the step of designating a mix of call programs to be run includes the computer implemented step of:

displaying a graphical control for each selected test case script, said graphical control being user operable to set a percentage of available ports allocated to a call program associated with a test case.

7. The method as claimed in claim 6, wherein said graphical control includes a graphical bar indicator.

8. The method as claimed in claim 6, wherein said step of designating a mix of call programs to be run includes the computer implemented step of:

displaying a composite control, said composite control indicating a percentage of available ports allocated to all call programs of said set.

9. The method as claimed in claim 8, wherein said composite control is user operable to set a percentage of available ports allocated to all call programs of said set.

10. The method as claimed in claim 1, wherein said step of designating the mix of call programs includes the step of:

designating different mixes of call programs of said set for selected time periods over a stress test run.

11. The method as claimed in claim 10, said step of designating different mixes of call programs for selected time periods over a stress test run includes the computer implemented steps of:

prompting a user to enter a start time and an end time for said stress test run;

in response to user entry of a start time and an end time for said stress test run, displaying a control permitting for said user to select particular times between said start time and said end time;

in response to user selection of a particular time, displaying a call mix control for each call program of said set, said call mix control being user operable to control the mix of call programs run at said particular time.

12. A method of managing telecommunications system testing, which comprises the steps of:

displaying a list of available bulk call generators, each of said bulk call generators including a plurality of ports;

displaying a list of available test case scripts;

in response to user selection of selected test case scripts from said list of available test case scripts, generating call programs from said selected test case scripts to form a set; and, displaying a graphical control for each selected test case script of said set, said graphical control being user operable to set a percentage of available ports of selected bulk call generators allocated to the call program associated with the test case script.

13. The method as claimed in claim 12, including the computer implemented step of:

displaying a composite control, said composite control indicating the percentage of available ports allocated to all call programs of said set.

14. The method as claimed in claim 13, wherein said composite control is user operable to set a percentage of available ports allocated to all call programs of said set.

15. The method as claimed in claim 12, including the computer implemented step of:

enabling a user to designate different mixes of call programs of said set for selected time periods over a test run.

16. The method as claimed in claim 15, said step of enabling a user to designate different mixes of call programs for selected time periods over a test run includes the computer implemented steps of:

prompting a user to enter a start time and an end time for said test run;

in response to user entry of a start time and an end time for said test run, displaying a control for permitting said user to select particular times between said start time and said end time; and, in response to user selection of a particular time, displaying a call mix control for each call program of said set, said call mix control being user operable to control the mix of call programs run at said particular time.

17. A method of managing telecommunications testing, which comprises the computer implemented steps of:

associating test case scripts with call programs to form a set; and, designating a mix of call programs of said set to be run on selected bulk call generators, wherein each of said bulk call generators includes a plurality of ports and said mix of call programs includes a percentage of ports of said bulk call generators allocated to each designated call program.

18. The method as claimed in claim 17, wherein said step of designating a mix of call programs includes the computer implemented steps of:

computing a number of available ports; and, allocating available ports to call programs based on said mix.

19. The method as claimed in claim 18, wherein the step of designating a mix of call programs to be run includes the computer implemented step of:

displaying a graphical control for each selected test case script, said graphical control being user operable to set a percentage of available ports allocated to a call program associated with a test case.

20. The method as claimed in claim 19, wherein said graphical control includes a graphical bar indicator.

21. The method as claimed in claim 19, wherein said step of designating a mix of call programs to be run includes the computer implemented step of:

displaying a composite control, said composite control indicating a percentage of available ports allocated to all call programs of said set.

22. The method as claimed in claim 20, wherein said composite control is user operable to set a percentage of available ports allocated to all call programs of said set.

23. A method of managing telecommunications testing, which comprises the computer implemented steps of:

associating test case scripts with call programs to form a set; and, designating different mixes of call programs of said set to be run on selected bulk call generators for selected time periods over a stress test run.

24. The method as claimed in claim 23, said step of designating different mixes of call programs for selected time periods over a stress test run includes the computer implemented steps of:

prompting a user to enter a start time and an end time for said stress test run;

in response to user entry of a start time and an end time for said stress test run, displaying a control for permitting said user to select particular times between said start time and said end time;

in response to user selection of a particular time, displaying a call mix control for each call program of said set, said call mix control being user operable to control the mix of call programs run at said particular time.

* * * * *